US012664364B2

(12) United States Patent
Janbandhu et al.

(10) Patent No.: US 12,664,364 B2
(45) Date of Patent: Jun. 23, 2026

(54) ELECTRONIC TEXT ANALYSIS FOR DETECTING COMPUTER-GENERATED INTERACTION IN TEXT-BASED COMMUNICATIONS

(71) Applicant: Bank of America Corporation,
Charlotte, NC (US)

(72) Inventors: Amit Janbandhu, Princeton, NJ (US);
Priyeshkumar Patel, Hillsborough, NJ
(US); Jennifer Corzo, Ewing, NJ (US);
Bartholomew Sanjeevinathan, Chennai
(IN); Bhushan Patel, Piscataway, NJ
(US); Jitender Singh, Robbinsville, NJ
(US)

(73) Assignee: Bank of America Corporation,
Charlotte, NC (US)

( * ) Notice: Subject to any disclaimer, the term of this
patent is extended or adjusted under 35
U.S.C. 154(b) by 194 days.

(21) Appl. No.: 18/763,295

(22) Filed: Jul. 3, 2024

(65) Prior Publication Data

US 2026/0010717 A1 Jan. 8, 2026

(51) Int. Cl.
G06F 40/253 (2020.01)
G06F 40/289 (2020.01)
(52) U.S. Cl.
CPC .......... G06F 40/253 (2020.01); G06F 40/289
(2020.01)
(58) Field of Classification Search
None
See application file for complete search history.

(56) References Cited

U.S. PATENT DOCUMENTS

| | | | |
|---|---|---|---|
| 9,794,260 B2 | 10/2017 | Loughlin-McHugh et al. | |
| 9,875,357 B2 | 1/2018 | Chen et al. | |
| 10,546,183 B2 | 1/2020 | Rodriguez et al. | |
| 10,990,762 B2 * | 4/2021 | Madavarapu | ........... G06N 7/01 |
| 11,196,859 B1 | 12/2021 | Yin | |
| 12,438,836 B1 * | 10/2025 | Marinescu | .............. H04L 51/02 |
| 2021/0152496 A1 * | 5/2021 | Kim | ........................ H04L 51/02 |
| 2023/0386506 A1 | 11/2023 | Shor et al. | |
| 2024/0363103 A1 | 10/2024 | Altaf et al. | |
| 2024/0363125 A1 | 10/2024 | Khoury et al. | |
| 2024/0386212 A1 * | 11/2024 | Brad | ........................ G06F 40/35 |

OTHER PUBLICATIONS

McIntire et al., "Methods for Chatbot Detection in Distributed
Text-based Communications", May 17-21, 2010, 2010 International
Symposium on Collaborative Technologies and Systems (Year:
2010).*
Feb. 6, 2026—(US) Notice of Allowance—U.S. Appl. No. 18/763,161.

* cited by examiner

*Primary Examiner* — Nafiz E Hoque
(74) *Attorney, Agent, or Firm* — Banner & Witcoff, Ltd.

(57) ABSTRACT

A text analysis processing for detecting computer-generated
text is provided. In some cases, a text-based chat interaction
may be initiated and analyzed to determine whether the
text-based chat generated by a communicating entity is
computer-generated. The text of the chat session may be
analyzed to evaluate punctuation, use of emojis, spacing,
grammar, words, phrases, and the like to determine a further
likelihood of whether the text is computer-generated. A
duration of the chat session may be used as a scoring factor.
The various probabilities and scores may be combined to
provide a composite score.

20 Claims, 7 Drawing Sheets

110

111

112

113

ELECTRONIC TEXT ANALYSIS FOR DETECTING COMPUTER-GENERATED INTERACTION IN TEXT-BASED COMMUNICATIONS

BACKGROUND

Aspects described herein relate to electrical computers, systems, and devices for electronically analyzing speech and text to determine whether the speech and/or text correspond deviates from expected speech or text.

Computing technology, including artificial intelligence (AI), has grown and evolved to provide many services, capabilities and functions. For example, AI is able to generate artificial voice speech as well as artificial text to mimic human conversations and interactions. Additionally, individuals or organization may use computing technology to mimic human speech or text communications based on manual input. In some cases, AI and other computing technologies have been used to generate such artificial speech or text for fraudulent, unauthorized and/or malicious purposes. Such purposes may include phishing attempts, attempts to corrupt an electronic system, attempts to change contact information for a user's account, attempts to access various types of information or records, attempts to gain unauthorized access to an individual's finances, and the like.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome existing limitations on detecting computer-generated fraud attempts or other computer-generated artificial interactions. For example, to combat increasing fraud attempts or artificial interactions, which involve the use of computer-generated voices and/or computer-generated text (e.g., for identity theft, phishing attempts etc.), an intelligent and automated speech and text recognition and analysis tool, system, and process may be used. Using such a system and process will allow companies, organizations, and individuals to detect non-human-originated voice and text interactions. Such interactions may be deemed malicious or otherwise fraudulent, and therefore ended more quickly so as to minimize or eliminate wasting resources (e.g., support personnel time and energy, computing resources, etc.). In one example, such speech and text recognition and analysis may be used to reduce fraudulent, artificial, or unauthorized interactions between clients (callers) and agents by prompting agents to report potential fraud attempts for further investigation and/or to end the call, thereby saving agent time. This in turn would allow those agents or individuals to address genuine calls (e.g., human calls) or text chats more quickly and in higher volumes.

In some examples, a computing platform may monitor and analyze interactions such as voice calls and text chat sessions in order to determine a likelihood that the interaction is computer-generated rather than human. The computing platform may receive audio signals, transcribe those signals, and perform multiple scoring analyses on those audio signals. For example, a voice speech analysis may be performed to generate a speech score, while a language analysis may be performed to generate a language score. For chat sessions, a speech score might not be used. Instead, a language analysis tool might not only analyze the words or phrases used in the chat session, but also punctuation (e.g., spaces, capitalization, etc.) and grammar.

In some examples, the computing platform may use different machine learning models to perform the various scoring analyses. For example, a first machine learning model may be used to analyze voice speech, while a second machine learning model may be used to analyze the language used in the audio. Additionally, different models may be used depending on one or more characteristics of the interaction, including a purpose of the interaction, a product or service associated with the interaction, a type of account associated with a caller or chat source, and the like and/or combinations thereof.

In some examples, the computing platform may also evaluate a duration of a voice call or other interaction and further generate a duration score. The duration score may reflect how much the length of an interaction deviates from an expected duration of that interaction. An expected duration may be determined based on one or more characteristics of the interaction.

According to one or more aspects, the computing platform may determine a composite interaction score to indicate a likelihood or risk that the interaction is AI- or computer-generated rather than human. Based on the composite interaction score, the computer platform may generate alerts, recommendations, notifications, and commands. For example, the computing platform may generate an interaction-end command configured to terminate an interaction (e.g., disconnect a call or chat session) and transmit that command to a user device through which the interaction is currently being performed.

According to still other aspects, information about interactions and a determination of whether the interactions are AI- or computer-generated or human may be use to update and train the various models used to generate the described interaction scores.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed herein, non-human voice calls, chat sessions or other interactions may adversely affect the functioning of a computer system, individual, or organization. For example, unauthorized or malicious interactions may impact the efficiency of a computer system to process legitimate interactions. In other examples, a computer system may be caused to execute malicious commands or functions that disrupt the proper functioning of the computer device or system. In yet another example, computer-generated interactions may cause an individual or device to inadvertently provide information to an unauthorized party.

Accordingly, aspects described herein provide for a dynamic system configured to process and analyze various types of interactions to determine the likelihood or risk that an interaction is computer-generated rather than human. The system may use machine learning models to analyze aspects of an interaction. For example, a first machine learning model may be used to analyze speech patterns (e.g., tones, inflections, volume, pitch, pronunciation of words, etc.) to determine a likelihood that speech used in a voice call reflects computer-generated speech. In another example, a second machine learning model may be used to analyze language used in the call as another likelihood value that the voice call is computer-generated. In yet another example, for chat or text-based interactions, a machine learning model may be used that evaluates not only words or phrases used, but also punctuation, sentence structure (e.g., spacing), grammar, and the like. Still further, a duration score may be generated based on how much the duration of an interaction deviates from an expected duration of the interaction. A combination of likelihoods or scores may then be used to determine further actions, alerts, recommendations, and the like for processing the interaction. Additionally, or alternatively, a determination made about the interaction may be used to further train the various machine learning models.

These and various other arrangements will be discussed more fully below.

Figure 1A:
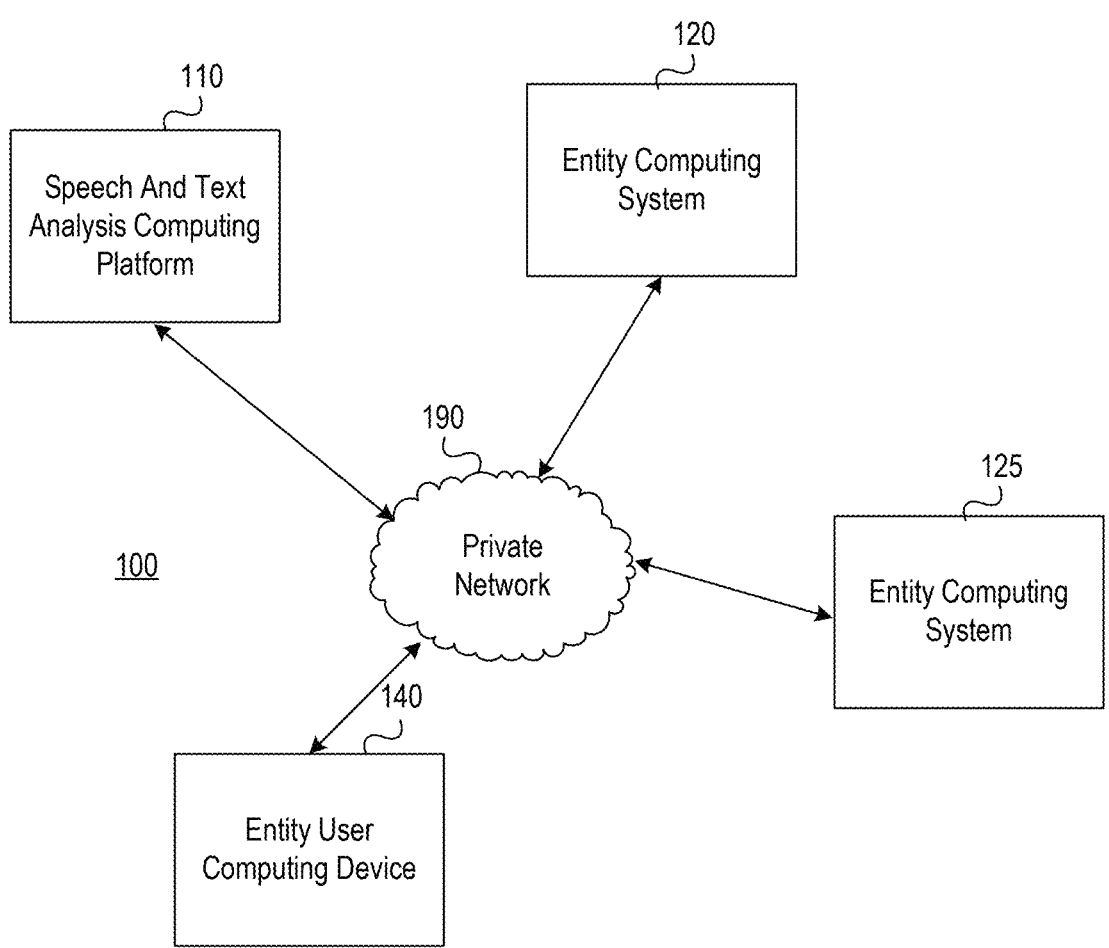
FIGS. 1A-1B depict an illustrative computing environment for a speech and text analysis service in accordance with one or more aspects described herein.
Figure 1B:
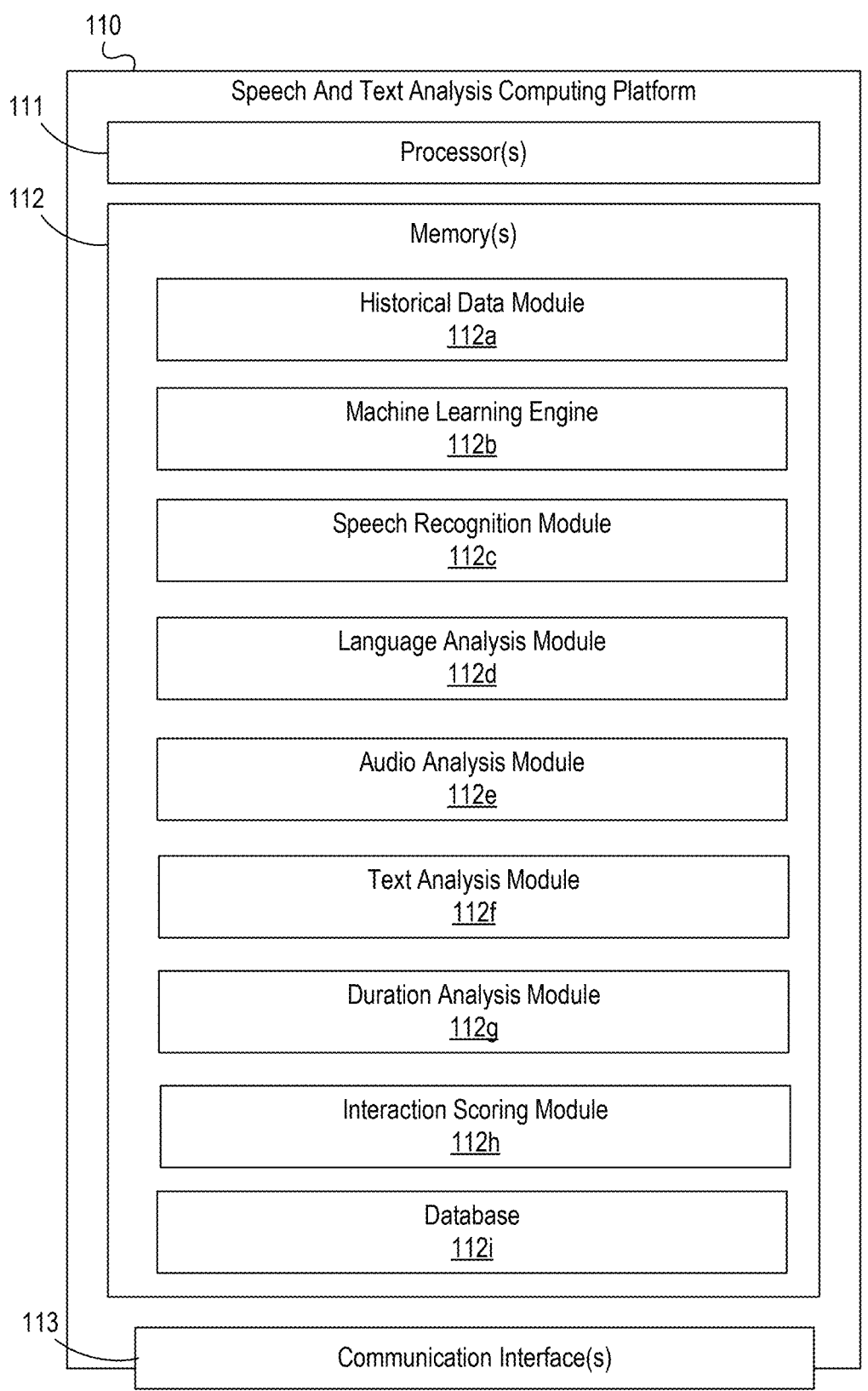

FIGS. 1A-1B depict an illustrative computing environment for implementing electronic speech and text analysis in accordance with one or more aspects described herein. Referring to FIG. 1A, computing environment 100 may include one or more computing devices and/or other computing systems. For example, computing environment 100 may include speech and text analysis computing platform 110, entity computing system 120, entity computing system 125 and entity user computing device 140. Although two entity computing systems 120, 125 and one entity user computing device 140 are shown, any number of systems or devices may be used without departing from the invention.

Speech and text analysis computing platform 110 may be or include one or more computing devices (e.g., servers, server blades, or the like) and/or one or more computing components (e.g., memory, processor, and the like) and may be configured to dynamically, and in real-time, monitor audio or text interactions (e.g., voice calls or chat sessions), analyze the audio, language, and/or text used therein, and determine a likelihood that the interaction is computer-generated. Additionally, in some arrangements, the speech and text analysis computer platform 110 may generate alerts, recommendations, information, notifications and commands. Such alerts, commands, and the like may be provided to another device (e.g., entity user computing device 140) through which the interaction is occurring. The other device may then be controlled to execute the command (e.g., display the alert or terminate an interaction) in response to receiving the communication from the speech and text analysis computer platform 110.

For instance, speech and text analysis computing platform 110 may be notified by entity user computing device 140 of voice call or chat session initiation upon the entity user computing device 140 answering a voice call or a text messaging session. Answering a voice call or text messaging session may include accepting a connection for a voice call (e.g., picking an analog voice call or accepting an IP voice call session) or accepting a connection for a chat session or responding to a text message. Once the speech and text analysis computing platform 110 is notified of the voice call or text messaging session being initiated, the speech and text analysis computing platform 110 may then begin monitoring the audio and/or text associated with the interaction. This monitoring may be performed continuously and/or in real-time. In some arrangements, voice calls and text chat sessions may be facilitated through the speech and text analysis computing platform 110 such that any call or interaction is accepted and coordinated therethrough. In other arrangements, the call or interaction facilitated and/or coordinated by the entity user computing device 140 and subsequently monitored by speech and text analysis computing platform 110 through a connection between the entity user computing device 140 and the computing platform 110.

In some examples, speech and text analysis computing platform 110 may obtain the audio signals associated with a voice call and/or text associated with a chat session and analyze the content of the interaction to determine a likelihood that the interaction is computer-generated versus human. For example, the speech and text analysis computing platform 110 may transcribe the audio signals of a voice call, and process both the audible speech as well as the language of the speech using various machine learning models. Speech and text analysis computing platform 110 may also monitor a duration of the interaction as a further indicator of whether the interaction is computer-generated or human.

Entity computing system 120 and/or entity computing system 125 may be or include one or more computing devices (e.g., servers, server blades, or the like) and/or one or more computing components (e.g., memory, processor, and the like) and may be configured to host or execute one or more organization applications or systems. For instance, entity computing system 120 and/or entity computing system 125 may host or execute internal or customer-facing applications or systems that may be accessed by one or more users via a network, such as a private network, public network, or the like. In some cases, entity computing system 120 and/or entity computer system 125 may be devices or terminals operated by personnel responsible for managing the speech and audio analysis operations and verify or monitor the results of the processing performed.

Entity user computing device 140 may be or include a computing device such as a desktop computer, laptop computer, tablet, smartphone, wearable device, and the like, that is associated with a user (e.g., an employee) of the organization. Entity user computing device 140 may communicate with speech and text analysis computing platform 110 to receive notifications and other information associated with a voice call, chat session or other interaction (e.g., other customer or external party interaction). In some examples, entity user computing device 140 may execute a customer service interface that allows the entity user computing device 140 to receive/accept voice calls and/or chat sessions. The entity user computing device 140 may further stream or provide the audio and text of these calls or sessions to the speech and text analysis computing platform 110 for real-time monitoring and analysis.

As mentioned above, computing environment 100 also may include one or more networks, which may interconnect one or more of speech and text analysis computing platform 110, entity computing system 120, entity computing system 125, and/or entity user computing device 140. For example, computing environment 100 may include network 190. Network 190 may include one or more sub-networks (e.g., Local Area Networks (LANs), Wide Area Networks (WANs), or the like). Network 190 may be associated with a particular organization (e.g., a corporation, financial institution, educational institution, governmental institution, or the like) and may be a private network interconnecting one or more computing devices associated with the organization. For example, speech and text analysis computing platform 110, entity computing system 120, entity computing system 125, and/or entity user computing device 140 may be associated with an organization (e.g., a financial institution), and network 190 may be associated with and/or operated by the organization, and may include one or more networks (e.g., LANs, WANs, virtual private networks (VPNs), or the like) that interconnect speech and text analysis computing platform 110, entity computing system 120, entity computing system 125, and/or entity user computing device 140 and one or more other computing devices and/or computer systems that are used by, operated by, and/or otherwise associated with the organization. Additionally, or alternatively, network 190 may be a public network, such as the internet, that may connect the systems and devices described.

Referring to FIG. 1B, speech and text analysis computing platform 110 may include one or more processors 111, memory 112, and communication interface 113. A data bus may interconnect processor(s) 111, memory 112, and communication interface 113. Communication interface 113 may be a network interface configured to support communication between speech and text analysis computing platform 110 and one or more networks (e.g., network 190, or the like). Memory 112 may include one or more program modules having instructions that when executed by processor(s) 111 cause speech and text analysis computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of speech and text analysis computing platform 110 and/or by different computing devices that may form and/or otherwise make up speech and text analysis computing platform 110.

For example, memory 112 may have, store and/or include historical data module 112a. Historical data module 112a may store instructions and/or data that may cause or enable speech and text analysis computing platform 110 to receive historical data related to past interactions such as voice calls and chat sessions as well as a determination made regarding those past interactions. For example, such a determination may include a likelihood score indicative of a likelihood that the interaction was computer-generated. This data may be used to train one or more machine learning models.

For instance, speech and text analysis computing platform 110 may have, store and/or include machine learning engine 112b. Machine learning engine 112b may store instructions and/or data that may cause or enable the speech and text analysis computing platform 110 to train, execute, update and/or validate one or more machine learning models. In some examples, machine learning may be based on regression, classification or other suitable techniques. The one or more machine learning models may be trained using the historical data received by historical data module 112a to detect patterns or sequences in previous parameter data. Voice call or chat session parameters (e.g., interaction parameters) may be input to the trained machine learning model and the model may be executed to output an interaction score that indicates how likely the speech or text from the other party is computer-generated or human. Multiple machine learning models and/or machine learning engines 112b may be used. Alternatively, or additionally, machine learning engine 112b may access third-party machine learning models such as Google's Text-to-Speech AI, Deepgram, Content at Scale, Scribbr, Turnitin, and the like and/or combinations thereof.

Speech and text analysis computing platform 110 may further have, store and/or include speech recognition module 112c. Speech recognition module 112c may be configured to receive audio input (e.g., from a voice call or voice interaction) and to identify the words used in the audio. Accordingly, the speech recognition module 112c may transcribe the speech in an audio call for further analysis. In one example, speech recognition module 112c may be based on a hidden Markov model (HMM). Speech recognition module 112 may be configured to detect a language of the speech and use different models or dictionaries based on the detected language. Speech recognition module 112 may also use multiple models or dictionaries if multiple languages are detected within the speech or voice call.

Speech and text analysis computing platform 110 may further have, store and/or include language analysis module 112d. Language analysis module 112d may store instructions and/or data that may cause or enable the speech and text analysis computing platform 110 to analyze the transcribed voice call or speech using a machine learning model to determine how likely the language (e.g., words and phrases) used in the interaction is from a human or corresponds to computer-generated (e.g., AI-generated) speech.

Speech and text analysis computing platform 110 may further have, store and/or include audio analysis module 112e. Audio analysis module 112e may store instructions and/or data that may cause or enable speech and text analysis computing platform 110 to analyze the audio of the voice call or other voice interaction to determine a likelihood that the audio is human-generated rather than computer-generated. For example, such audio analysis may include evaluating pitch, tone, inflections, volume, changes in such characteristics and the like and/or combinations thereof. These characteristics may be compared to a database of historical voice calls generated by humans and/or computers and characteristics thereof using a machine learning model to determine the likelihood of computer-generation versus human-origination.

Speech and text analysis computing platform 110 may have, store and/or include text analysis module 112f. Text analysis module 112f may store instructions and/or data that may cause or enable speech and text analysis computing platform 110 to analyze text inputted by a messaging party.

For example, the text analysis module 112*f* may evaluate the sentence structure (e.g., spacing), font, font size, punctuation, grammar, use of emojis or other text-based graphical representations, and the like and/or combinations thereof to determine whether the chat session or other text-based interaction is of human-origin or computer-generated. Text analysis module 112*f* may provide a text analysis score that is indicative of a likelihood that the chat session or interaction is from a computer such as an AI. In some examples, text analysis module 112*f* may use a machine learning model to analyze the text inputted by the communicating party to determine the above-noted likelihood. The machine learning model may be trained based on historical data or may comprise a third-party machine learning module or may be a combination of both.

Speech and text analysis computing platform 110 may further have, store and/or include a duration analysis module 112*g*. Duration analysis module 112*g* may store instructions and/or data that may cause or enable speech and text analysis computing platform 110 to determine and evaluate a current duration of an interaction. For example, duration analysis module 112*g* may monitor and determine how long a voice call or chat session has lasted. This information may then be used by duration analysis module 112*g* to determine a likelihood that the chat session or voice call or other interaction is of human-origin or computer-generated. This determination may include using a machine learning model that determines such likelihoods using interaction duration information and historical data.

Speech and text analysis computing platform 110 may further have, store and/or include an interaction scoring module 112*h*. Interaction scoring module 112*h* may store instructions and/or data that may cause or enable speech and text analysis computing platform 110 to determine and evaluate a current duration of an interaction. For example, interaction scoring module 112*h* may receive the scores generated by one or more of the audio analysis module 112*e*, language analysis module 112*d*, text analysis module 112*f* and duration scoring module 112*g* to determine a composite interaction score indicating a likelihood that the interaction (e.g., voice call or chat session) is computer-generated (e.g., generated by an AI). In some examples, interaction scoring module 112*h* may combine one or more of the scores using various weights and formulas. In one arrangement, the interaction scoring module 112*h* may combine one or more scores by adding the (weighted or unweighted) scores together. In another arrangement, the interaction scoring module 112*h* may multiply multiple various scores together. In some examples, different formulas may be used depending on one or more characteristics of the interaction.

Speech and text analysis computing platform 110 may further have, store and/or include database 112*i*. Database 112*i* may store data related to the various interactions such as a calling or chat-initiating party, geographical locations of the calling or chat-initiating party, a type of product or service being requested, a time of day, and/or other data that enables performance of aspects described herein by the speech and text analysis computing platform 110.

Figure 2A:
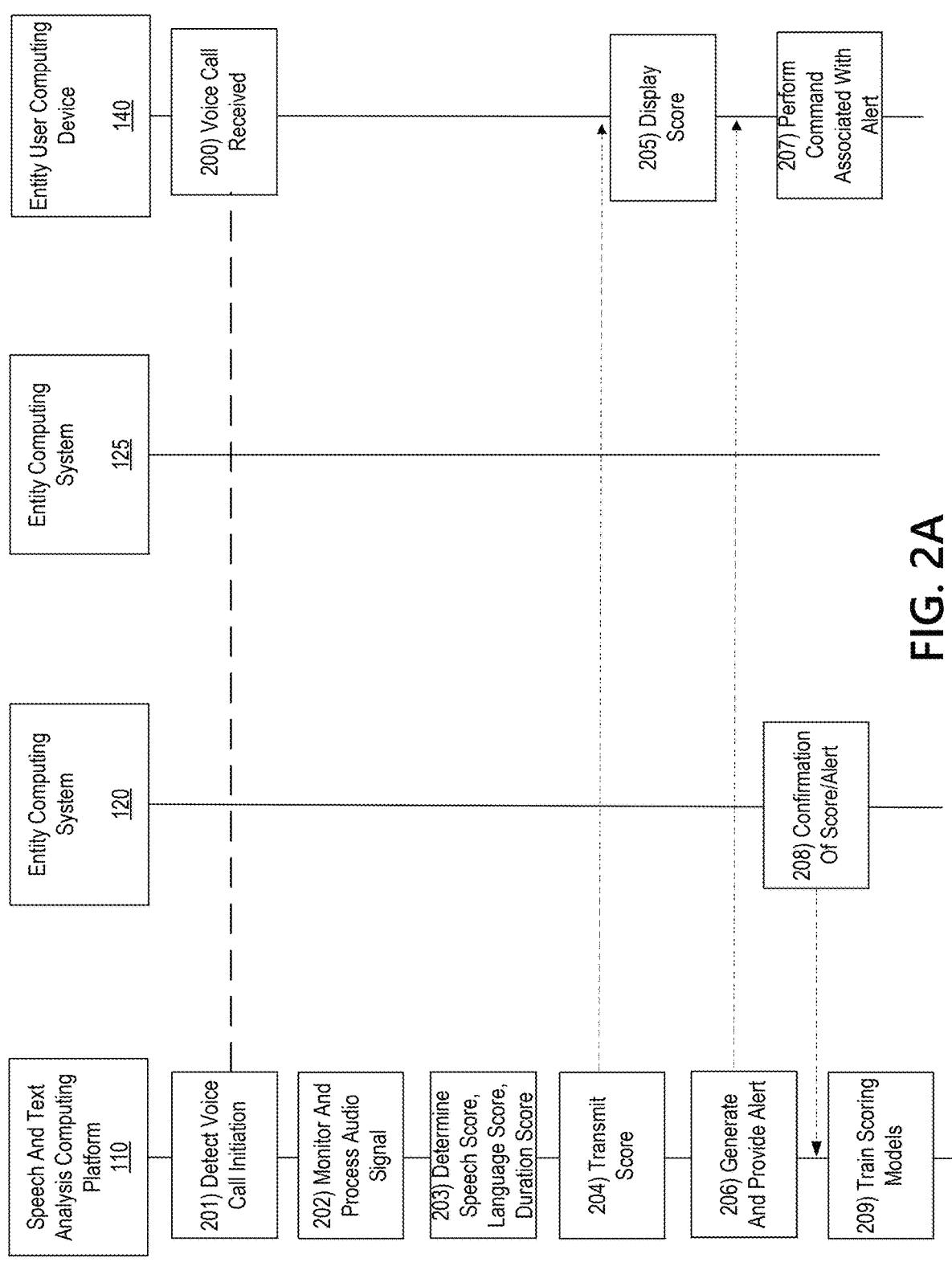
FIGS. 2A-2B depict an illustrative event sequence for speech and text processing and analysis in accordance with one or more aspects described herein.
Figure 2B:
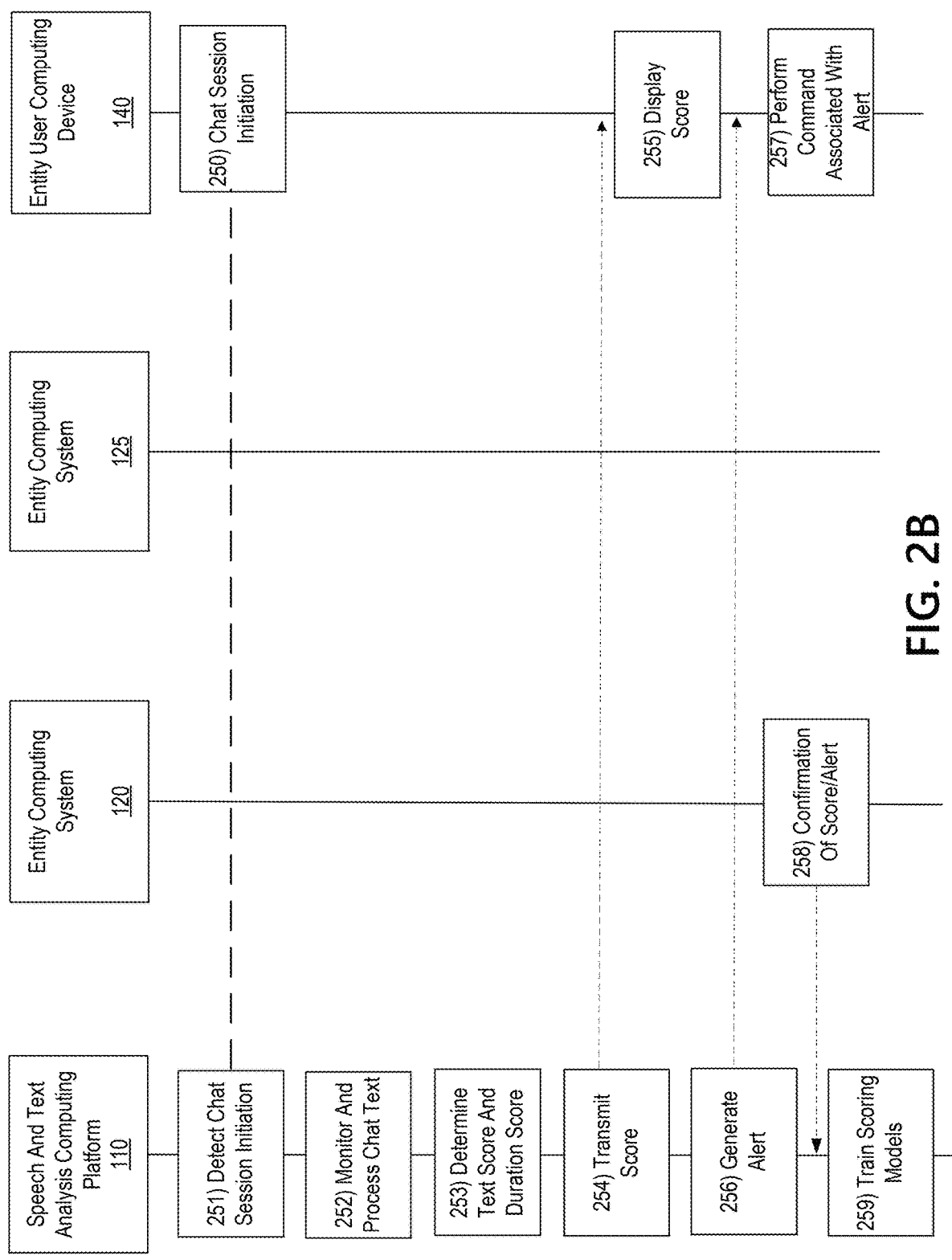

FIGS. 2A-2B depict example illustrative event sequences for analyzing a voice-based and text-based interactions such as voice calls and chat sessions in accordance with one or more aspects described herein. The events shown in the illustrative event sequence are merely one example sequence and additional events may be added, or events may be omitted, without departing from the invention. Further, one or more processes discussed with respect to FIGS. 2A-2B may be performed in real-time or near real-time.

With reference to FIG. 2A, at step 201, speech and text analysis computing platform 110 may detect the initiation of a voice call. For example, platform 110 may detect that entity user computing device 140 received and/or accepted a voice call (e.g., step 200). The entity user computing device 140 may, for instance, transmit a notification message to platform 110 upon an agent or other user accepting (e.g., picking up) a voice call through the entity user computing device 140. In some arrangements, the voice call may be facilitated, routed, and/or managed through platform 110 such that the notification of a voice call is transmitted from platform 110 to entity user computing device 140, and voice communications are routed via platform 110 once initiated.

At step 202, speech and text analysis computing platform 110 may monitor and process the audio signal corresponding to the voice call. For example, processing the audio signal may include using speech recognition to determine words, phrases, sounds and the like in the voice call and generate a transcription of the call. In some arrangements, speech and text analysis computing platform 110 may isolate only the audio from the other party, filtering out audio from a user or individual associated with the organization. Additionally, or alternatively, speech and text analysis computing platform 110 may additionally filter the audio signal to remove noise or other sounds that do not represent words or phrases. In still other examples, the speech and text analysis computing platform 110 may determine a context, product, service, geographic location and the like associated with the voice call or the other party.

At step 203, speech and text analysis computing platform 110 may analyze the audio signal of the voice call based on a variety of factors and to determine multiple computer-generated likelihood scores based on those factors. For example, the speech and text analysis computing platform 110 may analyze the audio signal using a first machine learning model to determine how likely the audio characteristics of a party's speech matches a computer-generated audio signal versus human audio (e.g., an audio speech score). In another example, the speech and text analysis computing platform 110 may analyze a transcription of the voice call (or portions thereof) to determine another likelihood of whether a party's speech is computer-generated (e.g., a language score) based on the transcription text. Additionally, or alternatively, the speech and text analysis computing platform 110 may monitor and analyze a duration of the voice call and determine a third likelihood that the call is with a computer-generated entity (e.g., a duration score). This duration likelihood may also be generated based on a machine learning model that tracks historical call durations. These analyses are described in further detail below.

In some examples, one or more of the machine learning models may be or include one or more supervised learning models (e.g., decision trees, bagging, boosting, random forest, neural networks, linear regression, artificial neural networks, logical regression, support vector machines, and/or other models), unsupervised learning models (e.g., clustering, anomaly detection, artificial neural networks, and/or other models), knowledge graphs, simulated annealing algorithms, hybrid quantum computing models, and/or other models. In some examples, training the machine learning model may include training the model using labeled data (e.g., labeled data identifying computing systems used to process historical requests, detected delays and remediation actions, and the like) and/or unlabeled data.

Additionally, at step 203, the speech and text analysis computing platform 110 may further generate a composite interaction score representing a likelihood that a party to the voice call is computer-generated (rather than human) by combining the various factor scores. In combining the factor scores, the speech and text analysis computing platform 110 may weight each factor score the same or differently. In some cases, some factor scores might not be combined if they are determined to be outliers relative to the other factor scores. For example, if an audio speech score shows a very low likelihood that the interaction is computer-generated, while the language (e.g., transcribed text) and duration scores show a very high likelihood of computer-generated origins, the audio speech score may be excluded from the composite interaction score.

At step 204, the composite interaction score may be transmitted from the speech and text analysis computing platform 110 to the entity user computing device 140. In some arrangements, this score may also be provided to one or more of entity computing systems 120 and 125. For example, entity computing systems 120 and 125 may be monitoring systems hosted by the organization to which the speech and text analysis computing platform 110 belongs. This score may then be displayed or otherwise visually or audibly represented on the entity user computing device 140 at step 205 so that a user of the device 140 recognizes a current risk or likelihood that the current interaction is with a computer-generated entity. In one example, a particular sound, volume of sound, length of sound, and the like may be generated at the entity user computing device 140 based on a magnitude of the composite interaction score. In another example, a visual color or grayscale gauge may be displayed at the entity user computing device 140 showing where the current composite interaction score lies along a spectrum of interaction scores.

At step 206, the speech and text analysis computing platform 110 may further determine whether the composite interaction score meets or exceeds one or more threshold scores. If so, the speech and text analysis computing platform 110 may generate one or more alerts and provide that alert to the entity user computing device 140. As with the composite interaction score, the alert may also be provided to one or more of entity computing systems 120 and 125. The alert may include a variety of information including a trigger or command for displaying information (e.g., a graphic or text), a trigger or command for playing a sound, a trigger or command for terminating a current interaction session, a trigger or command shutting down the entity user computing device 140, guidance information to be displayed to a user of the entity user computing device 140, a trigger or command to begin recording the interaction session, and the like and/or combinations thereof.

Accordingly, upon receipt of an alert, entity user computing device 140 may execute a corresponding command specified by the speech and text analysis computing platform 110 in the alert in step 207. For example, the entity user computing device 140 may display the score in the form of a gauge or in other forms, play a sound based on the composite interaction score, terminate an interaction session (e.g., disconnect a call or chat session), shutdown the entity user computing device 140 or one or more hardware or software components thereof, and the like and/or combinations thereof.

Speech and text analysis computing platform 110, in step 206, may also provide the alert to one or more of entity computing systems 120 and 125. For example, the alert may be transmitted to entity computing systems 120 and 125 for user confirmation of a determination made by the speech and text analysis computing platform 110. In one instance, the speech and text analysis computing platform 110 may determine that the voice call or chat session has a 90% likelihood that the other party in the voice call or chat session is a computer-generated entity. This information (and information about the interaction session) may be transmitted to one or more of entity computing systems 120 and 125 to confirm this determination in step 208. This confirmation may be a manual process and/or include a secondary analysis process performed by different machine learning models (i.e., different from the machine learning models used to determine the composite interaction score.

Upon receiving confirmation from one or more of entity computing systems 120 and 125, speech and text analysis computing platform 110 may, in step 209, feed the interaction information into one or more of the machine learning models used to determine the composite interaction score to further train and update those models.

FIG. 2B illustrates a communication and process flow through which a text-based interaction (e.g., a chat session) may be monitored and analyzed to detected non-human or computer-generated interactions. For example, in step 250, an entity user computing device 140 may accept, receive, initiate or otherwise activate a chat session with a third party. As with the process flow of FIG. 2A, an organization or individual may want to confirm that the third party is not a computer-generated (or non-human) entity. Accordingly, speech and text analysis computing platform 110 may detect the initiation of the text-based interaction in step 251 and begin monitoring the interaction to determine whether the interaction is based on computer-generated content (e.g., text messages). As explained for step 201, the detection of the interaction initiation may be performed in a variety of ways including based on the entity user computing device 140 providing a notification or the chat session being routed or facilitated through the speech and text analysis computing platform 110.

In step 252, speech and text analysis computing platform 110 may monitor (e.g., continuous and/or in real-time) the text received from the third-party entity. In some examples, speech and text analysis computing platform 110 may also monitor the text sent by a user of the entity user computing device 140. In one or more arrangements, speech and text analysis computing platform 110 may receive a real-time stream of text from entity user computing device 140. In other arrangements such as when the chat session is facilitated through speech and text analysis computing platform 110, speech and text analysis computing platform 110 may automatically record or otherwise store the communications between entity user computing device 140 and the third-party device. Additionally, speech and text analysis computing platform 110 may process the text interaction prior to analyzing the same. For example, speech and text analysis computing platform 110 may parse the text interaction into discrete parts (e.g., sentences, phrases, words, etc.). In another example, speech and text analysis computing platform 110 may determine whether any images (e.g., emojis, memes, animated images such as gifs or jpgs) are part of the session. If so, the images may be converted into text such as a description of the image, alt text, or metadata associated with the image.

In step 253, while monitoring the chat session, speech and text analysis computing platform 110 may determine interaction scores associated with the chat session. For example, speech and text analysis computing platform 110 may analyze the text of the chat session to determine a likelihood that the text was computer-generated that than human-generated. This analysis may involve the use of a machine learning model that evaluates the words and phrases used (similar to the text analysis in the process flow of FIG. 2A) and/or the sentence structure including punctuation, spacing, emojis or images used (type, description, existence of emojis or images), and the like and/or combinations thereof. Accordingly, speech and text analysis computing platform 110 may determine a text analysis score. Additionally, speech and text analysis computing platform 110 may also determine a duration score, as explained with respect to step 203 of FIG. 2A. Further, speech and text analysis computing platform 110 may determine a composite interaction score based on the text analysis score and the duration score, as also explained with respect to step 203. For example, various types of formulas, weights, and the like may be used to combine the text analysis score and duration score to determine a composite interaction score for the text-based interaction.

Steps 254-259 may involve substantially similar processes as described for steps 204-209 of FIG. 2A, and many of the details are not repeated here. For example, for text-based interactions such as chat sessions, the speech and text analysis computing platform 110 may similarly transmit (step 254) the interaction score to the entity user computing device 140 for display (step 255) or to be rendered in some other fashion (e.g., audible cues). Additionally, speech and text analysis computing platform 110 may evaluate the composite interaction store to determine whether an alert is to be generated. If so, an alert is generated in step 256 and provided to the entity user computing device 140. The entity user computing device 140 may then perform any commands associated with the alert in step 257, such as displaying information about the interaction (e.g., warnings, conversation scripts to follow, and the like) and/or commands to be executed. For example, one command may include termination the chat session. Another command may be to transfer the chat session to another user or system (e.g., a higher-level agent or a sandbox system). Steps 258 and 259 may involve transmitting a determination of likelihood along with text-based interaction information to another system (e.g., entity computing system 120 or 125) to validate the determination or analysis performed. If validated, data about the interaction and the determination made may be used to further train and update the machine learning models used for the analysis.

Figure 3:
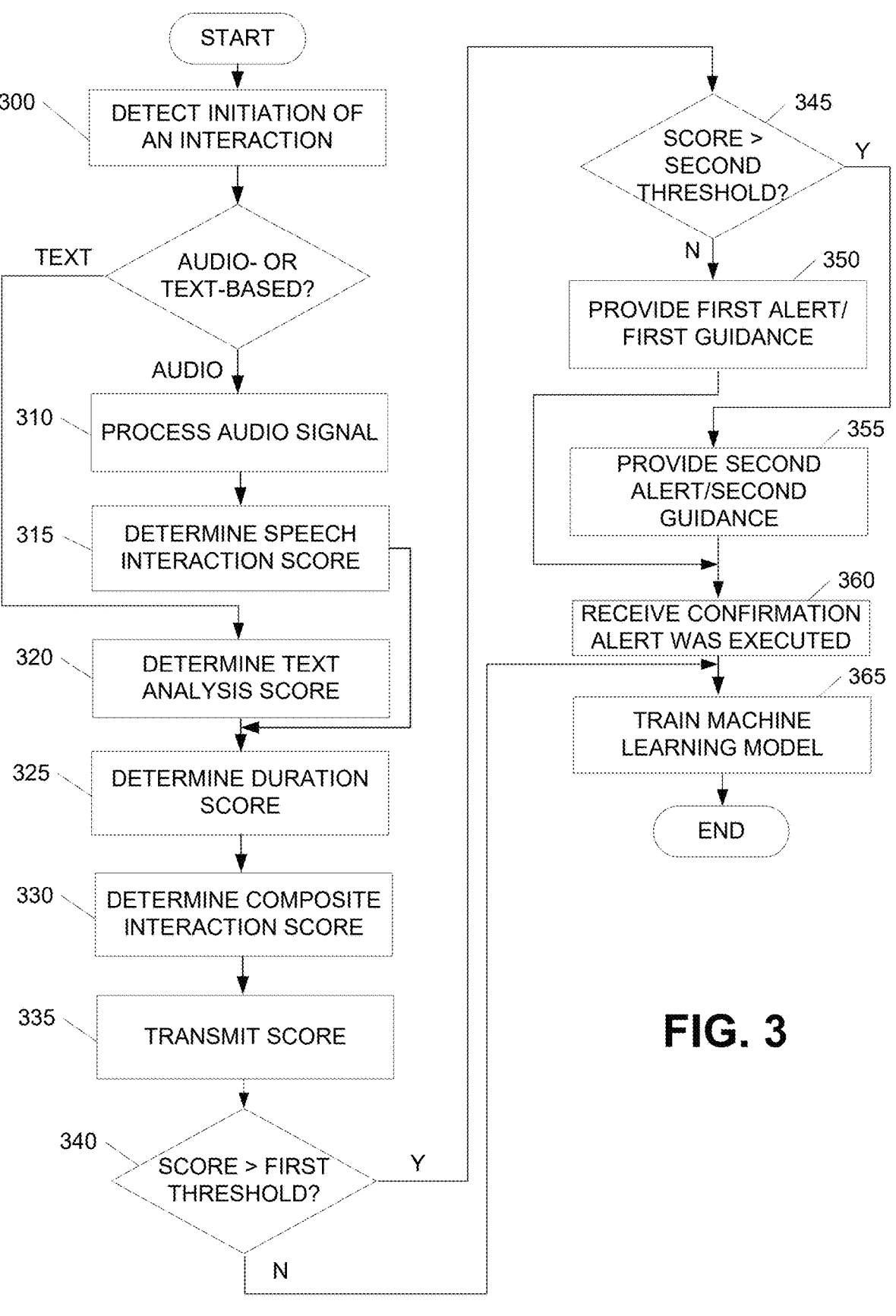
FIG. 3 depicts an illustrative method for processing and analyzing an interaction with another entity to determine a likelihood that the interaction is computer-generated in accordance with one or more aspects described herein.

FIG. 3 is a flowchart illustrating an example method by which an interaction analysis system such as speech and text analysis computing platform 110 (FIG. 1) may perform speech or text recognition and analysis to detect computer-generated entities. In step 300, the interaction analysis system may detect initiation of an interaction. The interaction may be text-based or audio-based. Detecting the initiation of the interaction may occur in a variety of ways including those discussed above. In one example, the interaction analysis system may facilitate all interactions including chat sessions and voice calls and therefore know of any interactions that are being initiated by devices connected thereto (e.g., a user device). In another example, the interaction analysis system may be notified by a user device conducting the interaction. The user device may be another device associated with the same organization as the interaction analysis system. In other cases, the user device may be a device that is independent of the interaction analysis system but that uses the interaction analysis system for detection services.

In step 305, the interaction analysis system may determine whether the interaction is text-based or voice-based. Determining a type of interaction may allow the interaction analysis system to identify the appropriate analysis or set of analyses to perform. For example, for text-based interactions, the interaction analysis system may perform a first text analysis process that considers words and phrases used, text and sentence structure (spacing, capitalization, punctuation, font, font size, sentence length), language, and the like. For voice- or audio-based interactions, the interaction analysis system may perform a second text analysis process that considers words and phrases used, but might not consider text or sentence structure since voice-based interactions would not exhibit such characteristics. Voice- or audio-based interactions may also be analyzed for audio characteristics including tone, pitch, inflections, volume, accents, and the like and/or combinations thereof.

If the interaction analysis system determines that the interaction is voice based, the system may proceed to step 310, in which the system may process the audio signal of the voice-based interaction (e.g., a voice call). Processing the audio signal may include the various functions and processes described above with respect to step 202 (FIG. 2A) and speech recognition module 112c (FIG. 1B). For example, the audio signal may be processed to filter out noise and/or the audio of individuals other than the third-party entity. Additionally, the audio may be transcribed into text.

In step 315, the interaction analysis system may perform speech analysis processing to determine a speech analysis score. The speech analysis score may represent a likelihood that the audio of the interaction (e.g., a third party associated with the interaction) is computer-generated rather than human.

Figure 4:
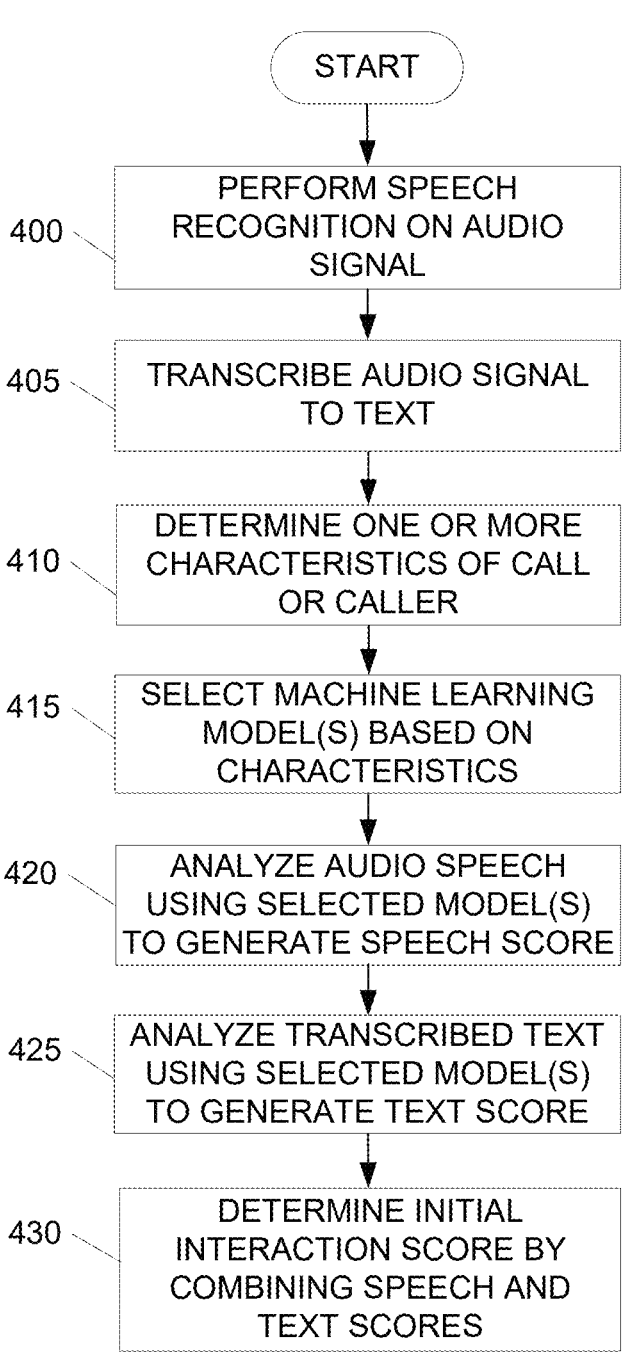
FIG. 4 depicts an illustrative method for processing and analyzing audio or speech in accordance with one or more aspects described herein.

Details of one example speech analysis process (step 315) is described with respect to FIG. 4. In step 400, the interaction analysis system or a subsystem thereof or a separate speech processing system may perform speech recognition on the audio signal. In some instances, the speech recognition process may select a language model based on a language of the audio. The language may be detected automatically or it may be specified by a user. Speech recognition may include determining the words and/or phrases used by the other entity during the voice call or other voice-based interaction. In conjunction with the speech recognition, the speech analysis system may transcribe the words and phrases used in step 405.

In step 410, the speech analysis system may determine one or more characteristics of the voice interaction or the other entity associated with the voice interaction. Such characteristics may include a location (e.g., geographic location), a language spoken, a service or product requested or otherwise involved in the voice interaction, an area code of the calling party, and the like and/or combinations thereof. Using these determined characteristics, the speech analysis system may, in step 415, select one or more machine learning models with which to process the audio signal of the voice interaction and the transcription of the audio signal. For example, different machine learning models may exist or be selected based on language, service or product, geographic location, and the like. Different machine learning models may account for the different words used in different languages or geographic locations, different pronunciations between languages or geographic locations, different expected terms common to a particular service or product and the like. Different machine learning models may also account for different accents or dialects.

In step 420, the speech analysis system may analyze the audio signal speech with the selected audio machine learning model to generate a speech score. As discussed, the speech score may reflect a likelihood that the speech is computer (e.g., artificially) generated. In one example, the higher the speech score, the higher the likelihood that the speech is artificially generated. Other score representations and scales may be defined as desired or needed. In some arrangements, multiple machine learning models to address multiple different parameters. For example, the speech and audio may be analyzed using a first machine learning model corresponding to a geographic location, as well as using a second machine learning model corresponding to type of service or product associated with the interaction. In such arrangements, the speech score may be generated based on a combination of a first sub-score determined using the first machine learning model and a second sub-score determined using the second machine learning model.

In step 425, the speech analysis system may analyze the transcribed text using a selected text machine learning model to generate a text score. As with the speech score, the text score indicates a likelihood that the words and phrases used in the speech is computer (e.g., artificially) generated.

In step 430, the speech analysis system may then generate a speech analysis score based on the speech score and the text score. The speech analysis score may be a combination of the speech and text scores, such as by addition, multiplication, division, and/or other formulas and mathematical computations. In some examples, the speech and text scores may be individually weighted to provide more importance to one or the other.

Referring again to FIG. 3, if, on the other hand, the interaction is determined to be a text-based interaction, the speech analysis system may instead perform a text analysis process in step 320 that is different from the text analysis process for an audio- or speech-based interaction (e.g., step 425 of FIG. 4). For example, the text analysis of step 320 may include not only analyzing the words and phrases used, but also the structure of the text including spacing, punctuation, spelling accuracy, capitalization, font, font size, and the like. The structure of the text may be considered for text-based interactions since those characteristics are determined by the party entering the text. In voice- or audio-based interactions, the transcription of the audio into text might not reflect intentional text structure. Text analysis may include selecting a machine learning model for analyzing text, including text structure as discussed above. This text analysis machine learning model may be different from the text analysis machine learning model used for transcribed text (e.g., as used for step 425 of FIG. 4). The text analysis machine learning model may be selected from multiple different learning models in similar fashion to the machine learning model selection for voice- or audio-based interactions (e.g., steps 410 and 415 of FIG. 4). For example, different machine learning models may be selected and used depending on a type of service or product associated with the interaction, a geographic location of the other party, a language used, font and/or font size used, and the like and/or combinations thereof. Additionally, multiple machine learning models to address multiple different parameters. For example, the text may be analyzed using a first machine learning model corresponding to a geographic location, as well as using a second machine learning model corresponding to type of service or product associated with the interaction. Based on this analysis, a text analysis score may be generated as a result. If multiple machine learning models are used, an aggregate or composite score may be determined using scores from each of the multiple models.

Whether audio-based or text-based interaction, the speech analysis system may further determine a duration score in step 325. A duration score may be a further indication of a likelihood that an interaction (or portion of an interaction by another party) is computer-generated or artificially-generated as opposed to human-generated. The duration score may be determined based on an expected duration of an interaction. The expected duration may be defined or otherwise determined based on one or more characteristics of the interaction (e.g., as described with respect to step 410 of FIG. 4). Those characteristics may include one or more of a type of interaction (e.g., product or service involved in the interaction), geographic location, language, account type (e.g., an account of the other party), and the like. An account type may include a type of financial service such as mortgages, retirement, savings, checking, and the like.

In step 330, the interaction analysis system may determine a composite interaction score based on a combination of the duration score and the other score determined for the interaction type. For example, for audio/speech interactions, the composite score may be determined based on a combination of the speech score and the duration score, while for text interactions, the composite score may be determined based on a combination of the text score and the duration score. A variety of formulas and manners of combining the scores may be used.

In step 335, the interaction analysis system may provide the composite score to one or more other systems, such as an entity user computing device currently handling the interaction. For example, the score may be transmitted to the other system or device for display to the user handling the call or chat session. Additionally, the interaction analysis system may, in steps 340 and 345, determine whether the composite score meets one or more thresholds. For example, if the composite score is greater than (or greater than or equal to) a first threshold, a first alert or action may be performed in step 350. If the composite score is greater than (or greater than or equal to) a second threshold, a second alert or action may be performed in step 355, as discussed in further detail below. A variety of thresholds and corresponding actions may be defined as needed or desired. For example, if the composite score is greater than the first threshold, the interaction analysis system may transmit a visual or audible alert to an organization user conducting the interaction with the other party. The alert may include a script to follow (through speaking or text) in order to avoid possibly becoming a victim to a phishing attempt. The alert may include a command that causes the other device to automatically perform the action (such as displaying the alert). In another example, the alert may include a command causing the other device to begin recording an audio or transcription of the interactive session.

If the composite score is greater than a second threshold, a different or additional alert may be issued by the interaction analysis system (e.g., in step 355). For example, the different or additional alert may be an elevated action or command to prevent an adverse result of the interaction. The alert may include a command causing the device to automatically terminate the call or chat session. The alert may also include a command that automatically transfers the call or chat session to another system or device (e.g., a security team). In another example, the alert may include a command causing the other system or device to join another party to the call or chat session for assistance. This joining operation may include specification of a network address (IP address) or a telephone number and instructing the other system or device to connect that address or number to the existing interaction.

In step 360, the interaction analysis system may receive a confirmation that the alert (e.g., a command) was successfully executed. This may allow the interaction analysis system to confirm that a corrective action was performed. For example, if confirmation is not received, the interaction analysis system may escalate the issue to another user or system. Further, in step 365, information about the interaction and the various scores determined and alerts generated (if any) may be fed into or otherwise used to train the machine learning models to generate the scores described herein. In some cases, the information about the interaction might only be used to train the machine learning models upon receiving confirmation that the assessment (e.g., the composite score) of the interaction was correct or accurate. This confirmation may require a manual review and user confirmation or other analysis.

The above process may be performed on a continuous basis as additional speech or text is received. The additional speech or text may be analyzed as discussed above to generate new or updated interaction scores corresponding to the new or additional speech and/or text. Similarly, the system may update the duration of the interaction and update a corresponding duration score. The further generated interaction scores may then be used to determine whether alerts, notifications or commands need to be generated and transmitted. In some cases, the further scores may be used to update the previously determined scores (e.g., a weighted combination or average based on amount of speech or text or other factors). The updated scores may then be used to judge whether notifications or alerts are needed. Additionally, or alternatively, the additional speech and/or text may be analyzed in aggregate with the previously received speech and/or text to generate one or more updated interaction scores.

According to one or more further aspects, video communications may further be analyzed using the aforementioned system. For example, video communications may include speech as well as video. Beyond the speech and audio, the video may also be analyzed using yet another machine learning model specific to determine whether the video is computer-generated (e.g., AI-generated video) or whether the actual video of a real human. For example, the analysis platform may evaluate characteristics such as movement shown in the video, facial characteristics, other body characteristics, and the like and/or combinations thereof.

In some arrangements, interactions may consistent of multiple components. For example, some audio calls may include both audio speech and text chat components. In such an example, both a text chat interaction analysis and a voice call analysis may be performed and the scores combined to determine a likelihood that the overall interaction is computer-generated. Each of the scores may be weighted (equal weights or non-equal weights) and subsequently combined to form a further composite score upon which further action is to be judged or based.

Figure 5:
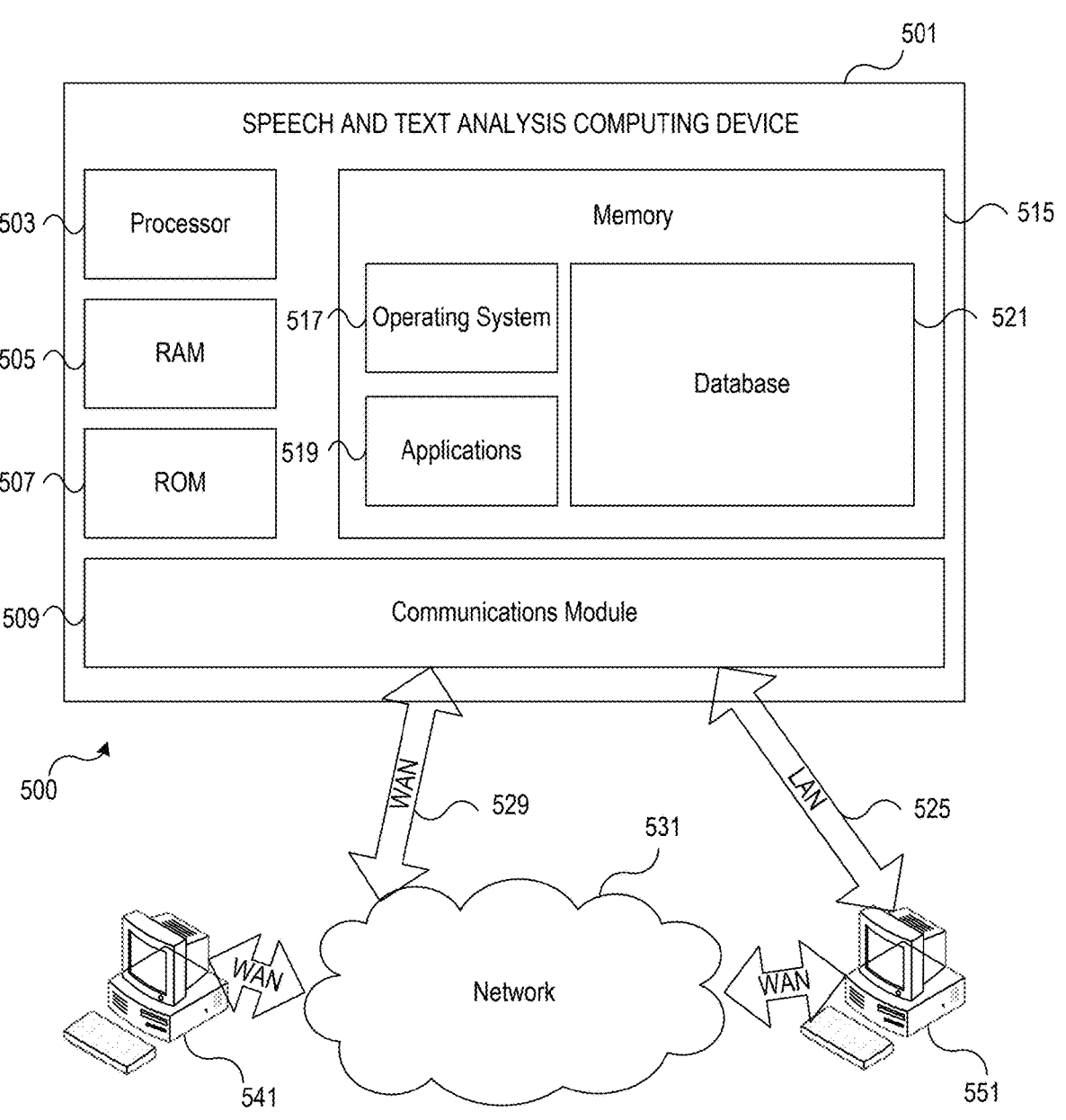
FIG. 5 illustrates one example environment in which various aspects of the disclosure may be implemented in accordance with one or more aspects described herein.

FIG. 5 depicts an illustrative operating environment in which various aspects of the present disclosure may be implemented in accordance with one or more example embodiments. Referring to FIG. 5, computing system environment 500 may be used according to one or more illustrative embodiments. Computing system environment 500 is only one example of a suitable computing environment and is not intended to suggest any limitation as to the scope of use or functionality contained in the disclosure. Computing system environment 500 should not be interpreted as having any dependency or requirement relating to any one or combination of components shown in illustrative computing system environment 500.

Computing system environment 500 may include speech and text analysis computing device 501 having processor 503 for controlling overall operation of speech and text analysis computing device 501 and its associated components, including Random Access Memory (RAM) 505, Read-Only Memory (ROM) 507, communications module 509, and memory 515. Speech and text analysis computing device 501 may include a variety of computer readable media. Computer readable media may be any available media that may be accessed by speech and text analysis computing device 501, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by speech and text analysis computing device 501.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on speech and text analysis computing device 501. Such a processor may execute computer-executable instructions stored on a computer-readable medium.

Software may be stored within memory 515 and/or storage to provide instructions to processor 503 for enabling speech and text analysis computing device 501 to perform various functions as discussed herein. For example, memory 515 may store software used by speech and text analysis computing device 501, such as operating system 517, application programs 519, and associated database 521. Also, some or all of the computer executable instructions for speech and text analysis computing device 501 may be embodied in hardware or firmware. Although not shown, RAM 505 may include one or more applications representing the application data stored in RAM 505 while speech and text analysis computing device 501 is on and corresponding software applications (e.g., software tasks) are running on speech and text analysis computing device 501.

Communications module 509 may include a microphone, keypad, touch screen, and/or stylus through which a user of speech and text analysis computing device 501 may provide input, and may also include one or more of a speaker for providing audio output and a video display device for providing textual, audiovisual and/or graphical output. Computing system environment 500 may also include optical scanners (not shown).

Speech and text analysis computing device 501 may operate in a networked environment supporting connections to one or more other computing devices, such as computing device 551 and 551. Computing devices 551 and 551 may be personal computing devices or servers that include any or all of the elements described above relative to speech and text analysis computing device 501.

The network connections depicted in FIG. 5 may include Local Area Network (LAN) 525 and Wide Area Network (WAN) 529, as well as other networks. When used in a LAN networking environment, speech and text analysis computing device 501 may be connected to LAN 525 through a network interface or adapter in communications module 509. When used in a WAN networking environment, speech and text analysis computing device 501 may include a modem in communications module 509 or other means for establishing communications over WAN 529, such as network 531 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A method for electronic text analysis for detecting computer-generated interaction, the method comprising:

detecting, by a text analysis computing platform, an initiation of a text-based interactive session through a computer network, the text-based interactive session being between a first entity and a second entity;

receiving, by the text analysis computing platform, text entered by the second entity in the text-based interactive session;

analyzing, by the text analysis computing platform using a first machine learning model, the entered text, the first machine learning model configured to generate a text score indicating a similarity between the entered text and text entered by a human by analyzing one or more words and punctuation used in the entered text;

monitoring, by the text analysis computing platform, a duration of the text-based interactive session;

generating, by the text analysis computing platform, a duration score, the duration score indicating a likelihood that the text-based interactive session is computer-generated by comparing the duration of the text-based interactive session with an expected duration for the text-based interactive session;

determining, by the text analysis computing platform, a composite interaction score for the text-based interactive session based on the text score and the duration score;

determining, by the text analysis computing platform, whether the composite interaction score is greater than a first threshold score; and in response to determining that the composite interaction score is greater than the first threshold score, generating and transmitting, by the text analysis computing platform, a command to a text interaction device different from the text analysis computing platform, the command configured to cause the text interaction device to terminate the text-based interactive session.

2. The method of claim 1, further comprising:

determining a characteristic associated with the text-based interactive session, the characteristic including at least one of: a product, a service, a geographic location, and an account type of the second entity; and selecting the first machine learning model from at least two machine learning models based on the determined characteristic.

3. The method of claim 2, further comprising:

determining the expected duration for the text-based interactive session based on the characteristic associated with the text-based interactive session.

4. The method of claim 1, further comprising:

in response to determining that the composite interaction score is less than the first threshold score but greater than a second threshold score, generating and transmitting a second command to the text interaction device, the second command configured to cause the text interaction device to display an alert.

5. The method of claim 1, further comprising:

in response to determining that the composite interaction score is greater than the first threshold score, initiating a trace on a network connection to identify a source of the text-based interactive session.

6. The method of claim 1, further comprising:

in response to determining that the composite interaction score is greater than the first threshold score, transmitting information about the text-based interactive session for user review; and upon receiving confirmation by the user review, providing information about the text-based interactive session and the confirmation to further train the first machine learning model.

7. The method of claim 1, further comprising:

receiving a further text comprising additional text entered by the second entity as part of the text-based interactive session;

processing the further text using the first machine learning model; and updating the text score based on the processing of the further text.

8. The method of claim 7, further comprising:

updating the duration score based on an updated duration of the text-based interactive session; and updating the composite interaction score by combining the updated text score and the updated duration score.

9. A text analysis computing apparatus comprising:

a processor; and memory storing computer-readable instructions that, when executed by the processor, causes the text analysis computing apparatus to:

detect an initiation of a text-based interactive session through a computer network, the interactive session being between a first entity and a second entity;

receive text entered by the second entity in the text-based interactive session;

analyze, using a first machine learning model, the entered text, the first machine learning model configured to generate a text score indicating a similarity between the entered text and text entered by a human by analyzing one or more words and punctuation used in the entered text;

monitor a duration of the text-based interactive session;

generate a duration score, the duration score indicating a likelihood that the text-based interactive session is computer-generated by comparing the duration of the text-based interactive session with an expected duration for the text-based interactive session;

determine a composite interaction score for the text-based interactive session based on the text score and the duration score;

determine whether the composite interaction score is greater than a first threshold score; and in response to determining that the composite interaction score is greater than the first threshold score, generate and transmit a command to a text interaction device different from the text analysis computing apparatus, the command configured to cause the text interaction call device to terminate the text-based interactive session.

10. The text analysis computing apparatus of claim 9, further comprising:

determining a characteristic associated with the text-based interactive session, the characteristic including at least one of: a product, a service, a geographic location, and an account type of the second entity; and selecting the first machine learning model from at least two machine learning models based on the determined characteristic.

11. The text analysis computing apparatus of claim 10, wherein the text analysis computing apparatus is further caused to:

determine the expected duration for the text-based interactive session based on the characteristic associated with the text-based interactive session.

12. The text analysis computing apparatus of claim 9, wherein the text analysis computing apparatus is further caused to:

in response to determining that the composite interaction score is less than the first threshold score but greater than a second threshold score, generate and transmit a second command to the text interaction device, the second command configured to cause the text interaction device to display an alert.

13. The text analysis computing apparatus of claim 9, wherein the text analysis computing apparatus is further caused to:

in response to determining that the composite interaction score is greater than the first threshold score, initiate a trace on a network connection to identify a source of the text-based interactive session.

14. The text analysis computing apparatus of claim 9, wherein the text analysis computing apparatus is further caused to:

in response to determining that the composite interaction score is greater than the first threshold score, transmit information about the text-based interactive session for user review; and upon receiving confirmation by the user review, provide information about the text-based interactive session and the confirmation to further train the first machine learning model.

15. The text analysis computing apparatus of claim 9, wherein the text analysis computing apparatus is further caused to:

receive a further text comprising additional text entered by the second entity as part of the text-based interactive session;

process the further text using the first machine learning model; and update the text score based on the processing of the further text.

16. A non-transitory computer-readable medium storing computer-readable instructions that, when executed cause a text analysis apparatus to:

detect an initiation of a text-based interactive session through a computer network, the interactive session being between a first entity and a second entity;

receive text entered by the second entity in the text-based interactive session;

analyze, using a first machine learning model, the entered text, the first machine learning model configured to generate a text score indicating a similarity between the entered text and text entered by a human by analyzing one or more words and punctuation used in the entered text;

monitor a duration of the text-based interactive session;

generate a duration score, the duration score indicating a likelihood that the text-based interactive session is computer-generated by comparing the duration of the text-based interactive session with an expected duration for the text-based interactive session;

determine a composite interaction score for the text-based interactive session based on the text score and the duration score;

determine whether the composite interaction score is greater than a first threshold score; and in response to determining that the composite interaction score is greater than the first threshold score, generate and transmit a command to a text interaction device different from the text analysis apparatus, the command configured to cause the text interaction call device to terminate the text-based interactive session.

17. The non-transitory computer-readable medium of claim 16, wherein the text analysis apparatus is further caused to:

determining a characteristic associated with the text-based interactive session, the characteristic including at least one of: a product, a service, a geographic location, and an account type of the second entity; and selecting the first machine learning model from at least two machine learning models based on the determined characteristic.

18. The non-transitory computer-readable medium of claim 17, wherein the text analysis apparatus is further caused to:

determine the expected duration for the text-based interactive session based on the characteristic associated with the text-based interactive session.

19. The non-transitory computer-readable medium of claim 16, wherein the text analysis apparatus is further caused to:

in response to determining that the composite interaction score is less than the first threshold score but greater than a second threshold score, generate and transmit a second command to the text interaction device, the second command configured to cause the text interaction device to display an alert.

20. The non-transitory computer-readable medium of claim 16, wherein the text analysis apparatus is further caused to:

in response to determining that the composite interaction score is greater than the first threshold score, initiate a trace on a network connection to identify a source of the text-based interactive session.

\* \* \* \* \*